US008536740B2

(12) United States Patent
Jackson et al.

(10) Patent No.: US 8,536,740 B2
(45) Date of Patent: Sep. 17, 2013

(54) VARIABLE FREQUENCY DRIVE WITH DIELECTRIC FLUID-IMMERSED TRANSFORMER

(75) Inventors: William Michael Jackson, Edmonton (CA); Kurt Johannes LeDoux, Canyon Lake, TX (US); Omid Ghoreishi, Edmonton (CA); Jeffrey Lim, Edmonton (CA); Obinna Ilochonwu, Edmonton (CA); Faruq Rajwani, Edmonton (CA); Adunola Ige, Sugar Land, TX (US)

(73) Assignees: Schlumberger Technology Corporation, Sugar Land, TX (US); Toshiba International Corporation, Houston, TX (US)

( * ) Notice: Subject to any disclaimer, the term of this patent is extended or adjusted under 35 U.S.C. 154(b) by 678 days.

(21) Appl. No.: 12/861,625

(22) Filed: Aug. 23, 2010

(65) Prior Publication Data

US 2012/0043922 A1    Feb. 23, 2012

(51) Int. Cl.
*H01H 3/00* (2006.01)
*H01H 9/30* (2006.01)
*H02H 3/00* (2006.01)

(52) U.S. Cl.
USPC ............................................. 307/116; 361/2

(58) Field of Classification Search
USPC .............................................. 307/116; 361/2
See application file for complete search history.

(56) References Cited

U.S. PATENT DOCUMENTS

| 5,625,545 | A | 4/1997 | Hammond |
| 6,014,323 | A | 1/2000 | Aiello et al. |
| 6,797,909 | B2 * | 9/2004 | Pride et al. ........................ 218/1 |
| 7,432,787 | B2 * | 10/2008 | Muench et al. .................. 335/76 |
| 2008/0192389 | A1 * | 8/2008 | Muench et al. .................... 361/5 |

* cited by examiner

*Primary Examiner* — Adi Amrany
(74) *Attorney, Agent, or Firm* — Tim Headley; Wayne I. Kanak

(57) ABSTRACT

A variable frequency drive system for controlling the frequency of a high-voltage power source supplied to a first electric motor includes a transformer section that includes a motorized loadbreak switch system, control power transformers, a controller programmed with control logic to ensure that the motorized loadbreak switch system opens contacts between the high-voltage power source and the variable frequency drive system once the power source is removed, and a tank containing a dielectric fluid, wherein the tank also contains, within the dielectric fluid, a manual isolation switch to supply or remove power to the transformer section, an impedance for use in soft-starting the variable frequency drive system, a primary winding, and a plurality of phase-shifted secondary windings.

8 Claims, 5 Drawing Sheets

VARIABLE FREQUENCY DRIVE WITH DIELECTRIC FLUID-IMMERSED TRANSFORMER

BACKGROUND OF THE INVENTION

1. Field of the Invention

The present invention relates to systems for controlling the rotational speed of an alternating current (AC) electric motor by controlling the frequency of the electrical power supplied to the motor. Such a system is called a variable frequency drive, or VFD.

2. Description of Related Art

Certain types of VFDs, particularly medium voltage drives, utilize an integral isolation transformer to improve the harmonics performance, and also, in some cases, to provide multiple floating secondary windings so that the inverter cells on the separate windings can be connected together in certain configurations to increase the output voltage level. Besides the transformer, the drives also typically include high power switching mechanisms, control power circuitry, and in some cases softcharge circuitry on the primary of the transformer.

U.S. Pat. No. 5,625,545 discloses a pulse-width-modulation drive for controlling medium-voltage alternating current motors. U.S. Pat. No. 6,014,323 discloses a multiphase power converter. Each one of these patents is incorporated by reference in its entirety.

All existing VFDs intended for installation in outdoor environments utilize a dry-type transformer, which is not suitable for outdoor environments, and also use components that can only be used at high voltage level inputs at high cost and with a large footprint.

Although there are many designs for VFDs that are well known in the art, considerable shortcomings remain. What is needed is a VFD that can be completely sealed for outdoor environments, and that can accept high input voltage.

BRIEF SUMMARY OF THE INVENTION

In one aspect, the present invention provides a variable frequency drive system for controlling the frequency of a high-voltage power source supplied to a first electric motor, comprising: a transformer section comprising a power supply, an energy storage device, a second electric motor, a controller, a control interface, and a tank containing a dielectric fluid, wherein the tank also contains, within the dielectric fluid: (a) a plurality of variable frequency drives; and (b) a motorized loadbreak switch system, the motorized loadbreak switch system adapted for opening and closing contacts between the high-voltage power source and the first electric motor; the motorized loadbreak switch system connected to the energy storage device; and wherein the controller is programmed, using the control interface, with control logic to ensure that the motorized loadbreak switch system opens the contacts between the high-voltage power source and the first electric motor once the power source is removed.

In another aspect of the invention, a method for controlling the frequency of a high-voltage power source supplied to a first electric motor is provided, comprising the steps of: (a) providing a transformer comprising a power supply, an energy storage device, a second electric motor, a controller, a control interface, and a tank containing a dielectric fluid, wherein the tank also contains, within the dielectric fluid: (i) a plurality of variable frequency drives; and (ii) a motorized loadbreak switch system connected to the second electric motor, the motorized loadbreak switch system adapted for opening and closing contacts between the high-voltage power source and the first electric motor; (b) connecting the energy storage device to the motorized loadbreak switch system; (c) connecting a controller to the energy storage device; and (d) using the control interface, programming the controller with control logic so that the motorized loadbreak switch system opens the contacts between the high-voltage power source and the first electric motor once the power source is removed.

Additional objectives, features, and advantages will be apparent in the written description which follows.

BRIEF DESCRIPTION OF THE DRAWINGS

The features characteristic of the invention are set forth in the appended claims. However, the invention itself, as well as a preferred mode of use, and further objectives and advantages thereof, will best be understood by reference to the following detailed description when read in conjunction with the accompanying drawings in which the left-most significant digit(s) in the reference numerals denote(s) the first figure in which the respective reference numerals appear, wherein:

Figure 1:
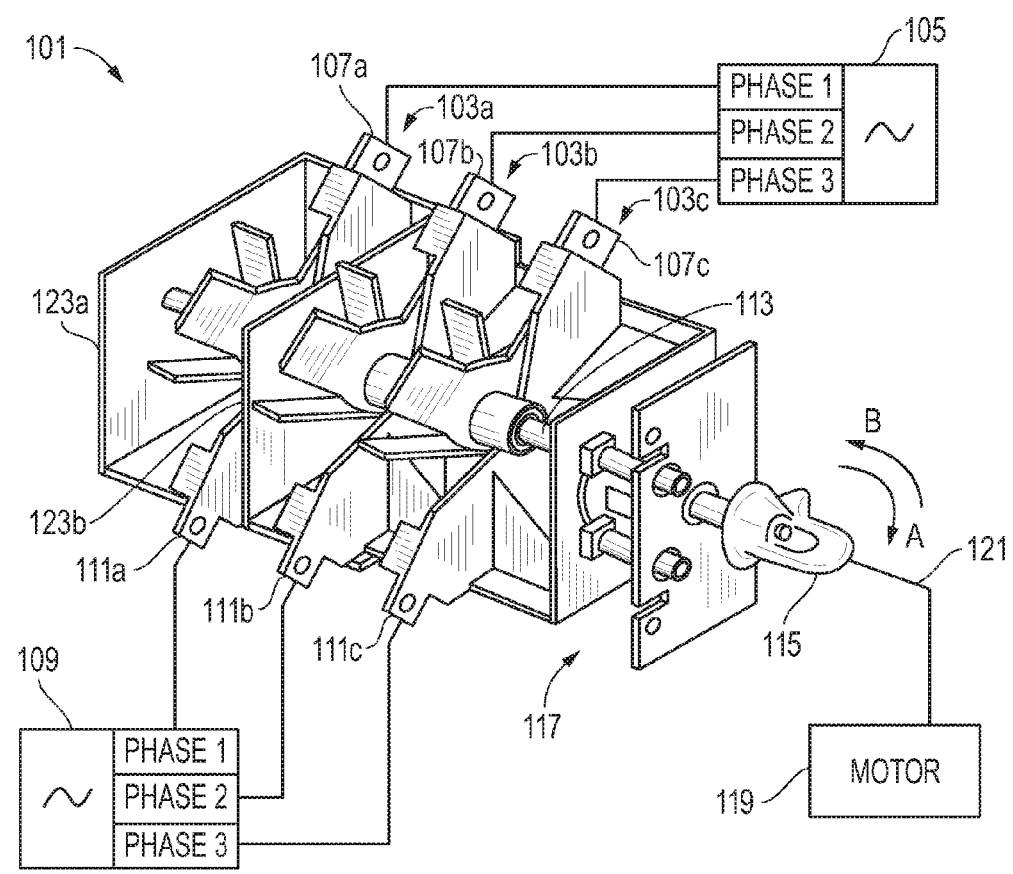
FIG. 1 is a perspective view of a prior art motorized switch.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

FIG. 1 depicts a prior art motorized switch 101 including three rotating switches 103a, 103b, 103c. Each of the rotating switches 103a, 103b, and 103c is adapted to switch a single phase of one or more power sources, and/or one or more loads.

For example, a high-voltage power source 105 might connect its first phase to stationary contact 107a, its second phase to stationary contact 107b, and its third phase to stationary contact 107c. A high-voltage power source 109 might connect its first, second, and third phases to stationary contacts 111a, 111b and 111c, respectively. Thus, the rotating switch 103a may select alternatively between the first phase of the power sources 105, 109 with the stationary contacts 107a and 111a, the rotating switch 103b may alternatively select between the second phase of the power sources 105, 109 with the stationary contacts 107b and 111b, and the rotating switch 103c may alternatively select between the last phase of the power sources 105, 109 with stationary contacts 107c and 111c.

The three-phase motorized switch 101 may be adapted to switch simultaneously each of the rotating switches 103a, 103b, 103c. More specifically, the rotating switches 103a, 103b, 103c are carried on a longitudinally extending shaft 113, and a handle 115 extends axially from the shaft 113. The handle 115 may be rotated, for example, in a first direction of rotation, indicated by the arrow A to charge a stored energy mechanism 117 that is also coupled to the shaft 113. The shaft 113 may connect each of rotating switches 103a, 103b, 103c. For example, the shaft 113 may extend through a rotational axis of each of the rotating switches 103a, 103b, 103c. When released, the stored energy mechanism 117 may cause the shaft 113 to rotate the rotating switches 103a, 103b, 103c simultaneously, at a speed independent of the speed of the operator. Alternatively, each of rotating switches 103a, 103b, 103c may include a separate actuator to actuate each of rotating switches 103a, 103b, 103c based on rotation of shaft 113. In either event, the three-phase motorized switch 101 may be used to switch simultaneously from the three phases of the first power source 105 to the three phases of the second power source 109. Alternatively, the three-phase motorized switch 101 may be adapted to switch two loads between a single three-phase power source.

Once the rotating switches 103a, 103b, 103c are completely rotated in the first direction of arrow A, the handle 115 may be rotated in a second direction, indicated by arrow B, opposite to the direction of arrow A to reset the stored energy mechanism 117 as described above. A motor 119 is connected to the handle 115 with a mechanical linkage 121 so that as the motor output shaft rotates a given amount in the direction of arrows A and B, so does the handle 115. The linkage 121 may be manually disconnected from the handle 115 if needed or as desired, and the handle 115 may be manually rotated to operate the switch and/or reset the stored energy mechanism 117. In one embodiment the handle 115 may be rotated about three hundred sixty degrees about its axis between first and second operating conditions of the switch 101.

Baffles 123a and 123b may be provided to form an electrical barrier to suppress arcing between the separate phases, or between a phase and ground, that otherwise might cause damage to the three-phase motorized switch 101. By preventing an initial phase-to-phase or phase-to-ground arc from occurring, the baffles 123a and 123b increase the safety and reliability of the three-phase motorized switch 101.

Figure 2:
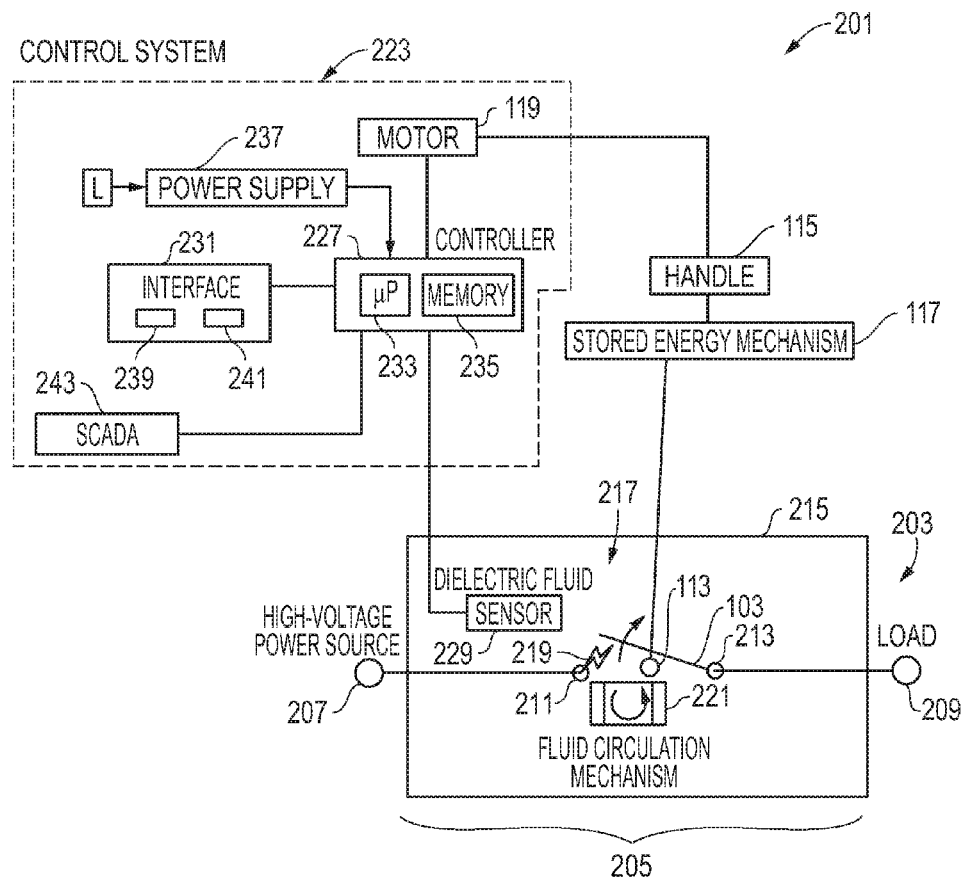
FIG. 2 is a graphical representation of a prior art control mechanism for motorized switches.

FIG. 2 is a schematic diagram of a prior art high-voltage motorized loadbreak switch system 201. The system includes a motorized loadbreak switch 203, which defines an electrical path 205 between a high-voltage power source 207 and a load 209. The electrical path 205 includes a rotating switch 103 having metallic switch contacts 211 and 213, and the rotating switch 103 is configured or adapted to open or close the electrical path 205 through the contacts 211 and 213. The high-voltage motorized loadbreak switch 203 may be used within a casing 215 that holds elements of the high-voltage motorized loadbreak switch 203 immersed, for example, in a dielectric fluid 217. In a known manner, the dielectric fluid 217 suppresses arcing 219 when the rotating switches 103a, 103b, 103c are opened to disconnect the load 209 from the high-voltage power source 207. In different embodiments, the dielectric fluid 217 may include, for example, base ingredients such as mineral oils or vegetable oils, synthetic fluids such as polyolesters, SF6 gas, and silicone fluids, and mixtures of the same.

The motorized high-voltage loadbreak switch 203 may be located, for example, in an underground distribution installation, and/or in a poly-phase industrial installation internal to a distribution or power transformer or switchgear. Normally, current is carried through the closed contacts 211 and 213. When the motorized loadbreak switch 203 is opened, the current is carried through an electrical arc that is formed as the contacts 211, 213 open and separate. As those of ordinary skill in the art will appreciate, the ability of the motorized loadbreak switch 203 to interrupt and extinguish the arc 219 that is formed by the opening of the contacts 211, 213 is a function of the length the arc 219 must travel as the contacts separate, the thermodynamic and dielectric properties of the dielectric fluid 217, the characteristics of the metal contacts 211 and 213, the rate at which the contacts 211 and 213 are separated, the rate that the fluid 217 recovers its dielectric capability as the arc 219 cools and passes through any normal current zero in an AC circuit, and the amount and type of gas generated as the arc 219 passes through the dielectric fluid 217.

In view of this, the motorized loadbreak switch 203 may optionally include a fluid circulation mechanism 221 that circulates the dielectric fluid 217 around the rotating switch 103 to improve the strength of the dielectric fluid 217 by removing conductive impurities caused by arcing, such as carbonization elements and bubbles.

In one prior art embodiment, the rotating switch 103, and the fluid circulation mechanism 221 are carried on a rotating shaft 113 that may be actuated by a handle 115 extending exterior to the casing 215. The handle 115 may be turned, for example, to move the rotating switch 103 as desired, and markings may be provided on an exterior of the switch casing 215 to indicate the operating position of the rotating switch 103 when the handle 115 is in a given position. A known stored energy mechanism 117, including, for example, spring elements, may be provided to drive or index the rotating switch 103 from one position to another to open and close the electrical path 205. In a known manner, turning of the handle 115 charges the stored energy mechanism 117, and once the rotating switch 103 is released via movement of the handle 115, the stored energy mechanism 117 moves the rotating switch 103 at a proper speed to extend the arc and interact with the fluid to safely interrupt load current when the motorized loadbreak switch 203 is operated. The handle 115 may be operable, for example, to drive the rotating switch 103 is a clockwise direction or counterclockwise direction to actuate the motorized loadbreak switch 203.

The motorized loadbreak switch 203 is, for example, a four position switch, explained further below, wherein the movement of the shaft 113 causes contact blades to shift from one position to another, and the blade movement reconfigures the connection of or isolation of power sources and/or loads by breaking or making electrical connections between contacts rotating with the shaft 113 and stationary contacts fixed to a switch block. When the handle 115 is rotated to charge the stored energy mechanism 117, a cam system releases a locking bar so the shaft 113 is free to rotate. The shaft 113 is then driven by the energy stored in the springs, and the shaft 113 may continue to be rotated in the same direction beyond three hundred sixty degrees of rotation by actuating the handle 115. To operate properly, the rotating switch 103, in response to actuation of the handle 115, must complete a switching operation and revert to an at-rest position after completion of the switching operation.

In another embodiment the motorized loadbreak switch 203 may be a two position on/off switch wherein the stored energy mechanism 117 is an over-toggled-spring that controls motion of the shaft 113 over a range less than three hundred sixty degrees. In this case, the movement of the shaft 113 must be reversed to operate the switch between the on and off positions.

In either a two position or four position switch, to operate the switch correctly, the handle 115 typically must be rotated a distance beyond the release point. The movable switch contacts of the rotating switch 103 are engaged to stationary contacts mounted to switch insulating structures with high enough force between the contacts to ensure acceptable current carrying capability. Consequently, significant input torque is required to move the handle 115 to the point of release, break the connection between the contacts, and enable the stored energy mechanism 117 to complete the remainder of the switching mechanism movement. Properly controlling input torque to the handle 115 is difficult, and operators tend to exert excessive force on the handle 115 to release the switching mechanism. Even if actuation of the handle 115 is motorized, a startup torque of the motor is not easy to control, and typically will result in some loading of the stored energy mechanism 117. Additionally, the amount of torque necessary to release the switching mechanism may vary at different times and locations due to temperature fluctuation, current fluctuation, and other factors. Such loading, to whatever degree, of the stored energy mechanism 117 is undesirable and impairs further use of the motorized loadbreak switch 203.

Therefore, to ensure proper operation of the motorized loadbreak switch 203, the loading of the stored energy mechanism 117 due to actuation of the handle 115 must be removed from the stored energy mechanism 117, allowing the mechanism 117 to return to a rest or neutral position before the motorized loadbreak switch 203 is again operated. When operated manually by a line technician with specially designed tools, the mechanism 117 is self-resetting. If used with a motorized driving system, the self-resetting mechanism 117 can easily be defeated by any residual force left on the mechanism by the motor, thereby frustrating the capability of the motorized loadbreak switch 203 to be controlled remotely.

To alleviate these and other concerns, in one prior art embodiment a control system 223 is provided. As shown in FIG. 2, the control system 223 may include a motor 119, a controller 227 communicating with the motor 119, one or more sensors or transducers 229 communicating with the controller 227, and a control interface 231.

The motor 119 is responsive to the controller 227 and is mechanically linked to the switch handle 115 to turn the handle to a position wherein the rotating switch 103 is released and the stored energy mechanism 117 may complete the movement of the rotating switch 103 to, for example, a fully opened or fully closed position. As one example, the motor 119 may be a known electric motor, and in a further embodiment the motor 119 may be a stepper motor that rotates an output shaft incrementally to predetermined positions, and the position of the motor output shaft may be precisely positionable. A variety of AC and DC electric motors may be used to power the handle 115 to a release position wherein the stored energy mechanism 117 may complete the movement of the rotating switch 103.

The controller 227 may be, for example, a microcomputer or other processor 233 coupled to the motor 119 and the control interface 231. A memory 235 is also coupled to the controller 227 and stores instructions, calibration constants, and other information as required to satisfactorily operate the motorized loadbreak switch 203 as explained below. The memory 235 may be, for example, a random access memory (RAM). In alternative embodiments, other forms of memory could be used in conjunction with RAM memory, including, but not limited to, flash memory (FLASH), programmable read only memory (PROM), and electronically erasable programmable read only memory (EEPROM).

Power to the control system 223 is supplied to the controller 227 by a power supply 237 configured or adapted to be coupled to a power line L. Analog to digital and digital to analog converters may be coupled to the controller 227 as needed to implement controller inputs from the sensor 229 and to implement executable instructions to generate controller outputs to the motor 119

The control interface 231 may be provided, either at the site of the motorized loadbreak switch 203 or in a remote location, and the interface 231 may include one or more control selectors 239 such as buttons, knobs, keypads, touchpads, and equivalents thereof that may be used by an operator to energize the motor 119 and open or close the motorized loadbreak switch 203. The interface may also include one or more indicators 241, such as light emitting diodes (LEDs), lamps, a liquid crystal display (LCD), and equivalents thereof that may convey operating and status information to the operator. The control interface 231 is coupled to the controller 227 to display appropriate messages and/or indicators to the operator of the motorized loadbreak switch 203 and confirm, for example, user inputs and operating conditions of the motorized loadbreak switch 203.

In response to user manipulation of the control interface 231, the controller 227 monitors operational factors of the motorized loadbreak switch 203 with one or more sensors or transducers 229, and the controller 227, through the motor 119, actuates the switch handle 115. In one prior art embodiment, the controller 227 may further be coupled to a remote operating control system 243, such as a known Supervisory Control and Data Acquisition (SCADA) system. Using the remote operating control system 243, the motorized loadbreak switch 203 may be remotely monitored and controlled.

Figure 3:
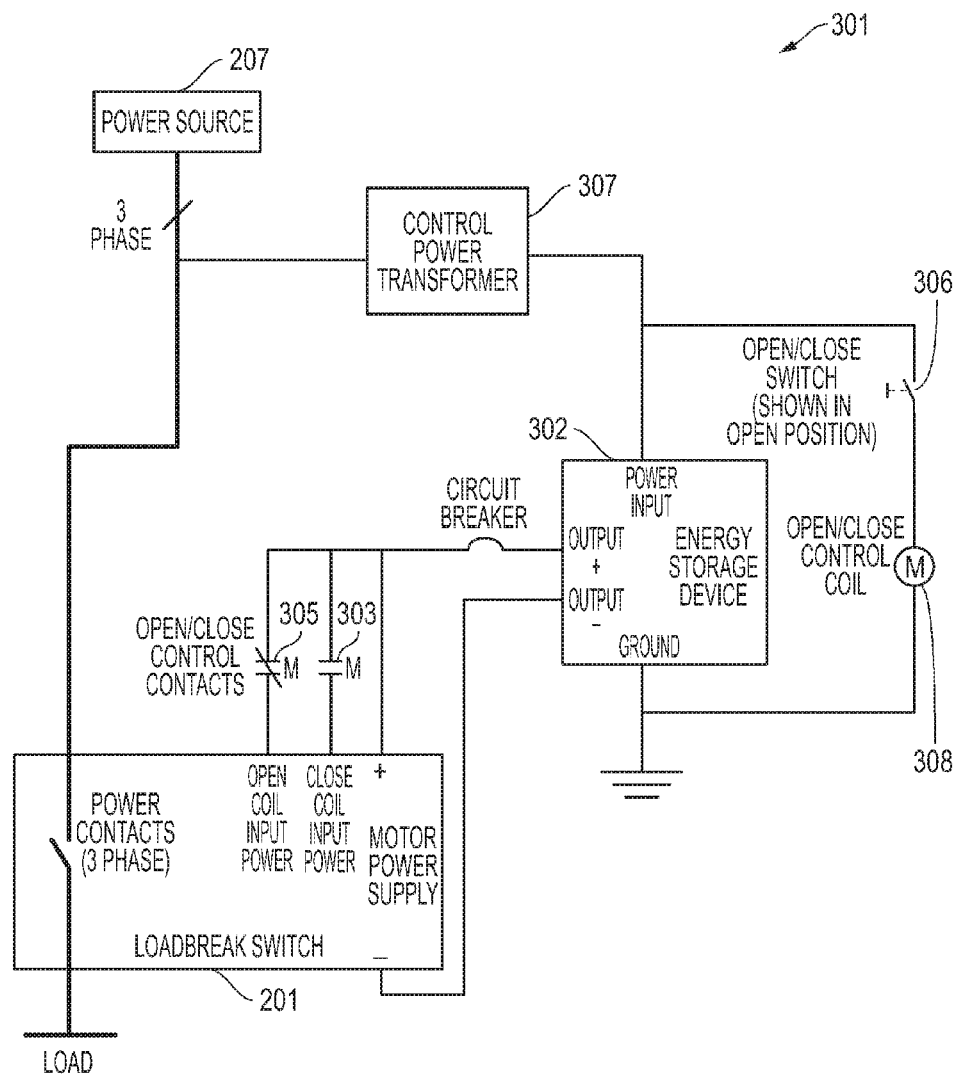
FIG. 3 is a graphical representation of an illustrative embodiment of a fail-open system for a motorized switch.

Referring now to FIG. 3, a fail-open motorized switch system 301 includes an energy storage device 302, such as an uninterruptable power supply or battery, that is continually charged by a control power transformer 307 fed by the power source 207. To open or close the high voltage loadbreak switch system 201, using control logic, power from the energy storage device 302 is directed to either an "open coil" contact 303 or a "close coil" contact 305 of the loadbreak switch system 201. The energy storage device 302 also provides power to the motor 119 inside the loadbreak switch system 201.

During normal operation (i.e. while power source 207 is supplying power), the user can control the opening and closing of the loadbreak switch system 201 by using the open/close switch 306. If the open/close switch 306 is moved to the close position, the open/close control coil 308 becomes energized, and the normally closed control contact 305 and the normally open control contact 303 change state and are opened and closed respectively. The output of the energy storage device 302 is thus directed to the close coil input power terminal of the loadbreak switch system 201, thus closing the rotating switch 103. If the user opens the open/close switch 306, the open/close control coil 308 becomes deenergized, and the normally closed control contact 305 and the normally open control contact 303 change their state to their normal state and are closed and opened respectively, and the output of the energy storage device 302 is thus directed to the open coil input power terminal of the loadbreak switch system 201, thus opening the rotating switch 201.

In case of loss of power supply from power source 207 and subsequently control power transformer 307, the open/close control coil 308 becomes deenergized regardless of the position of the open/close switch 306, ensuring the normally closed contact 305 and the normally open contact 303 are back to their normal state and thus directing power from the energy storage device 302 to the open coil input power terminal of the loadbreak switch system 201.

In other words, the control logic is designed such that upon loss of power, the output of the energy storage device 302 is directed to the open coil input power terminal of the loadbreak switch system 201, and the energy storage device 302 is designed such that it stores sufficient energy to energize the open coil of the loadbreak switch system 201 in the absence of the power source 207.

Figure 4:
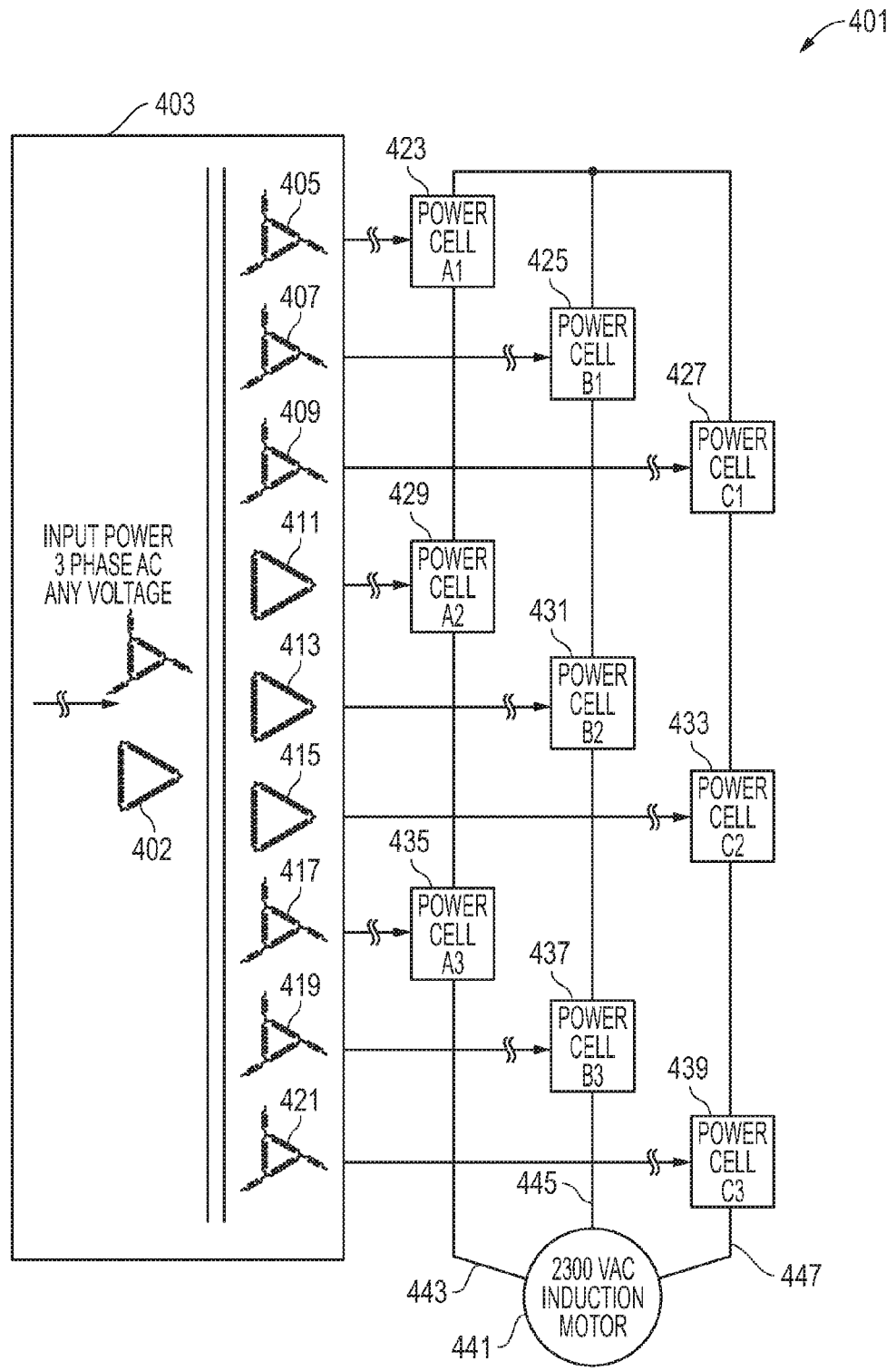
FIG. 4 is a schematic diagram of a prior art variable frequency, medium-voltage, pulse-width modulation topology drive, using mesh-connected secondary windings.

Referring now to FIG. 4, which illustrates a prior art variable frequency drive 401, a star-type configuration is one in which each phase shares a common node or connection, with every other phase, and may be composed of an arbitrary number of phases. In a three-phase circuit, such a star configuration may be referred to as a WYE connection. A zig-zag transformer may be considered as a special case of a star-configured transformer. In contrast, a mesh-type configuration is one in which two respective phases are connected by a respective impedance, and may be composed of an arbitrary number of phases. In a three-phase circuit, such may be referred to as a DELTA configuration. An extended-delta transformer may be considered as a special case of a mesh-configured transformer. Although the following embodiments are described in terms of three-phase power circuits, the invention may also be applied to other multi-phase circuit configurations, e.g., six phase.

As shown in FIG. 4, three-phase AC input power is supplied to primary winding circuit 402 of power supply transformer 403. Primary winding circuit 402, which may be star- or mesh-connected, energizes three-phase secondary winding circuits 405 through 421. The three-phase power associated with each of secondary winding circuits 405 through 421 can be supplied to power cells 423 through 439, respectively. In this embodiment it is preferred to provide mesh-connected secondary winding circuits 405 through 421 to lower the power supply transformer's K-factor and to improve harmonics control. Mesh-connected windings may include, for example, delta or extended delta configurations. Under certain circumstances, such mesh windings may be manipulated to advance some of the secondary windings by preselected degrees of electrical phase, to retard other secondary windings by preselected degrees of electrical phase, or to leave other secondary windings substantially unshifted in phase.

In the prior art embodiment shown in FIG. 4, preferably one-third of the secondary winding circuits are advanced in phase by 20 degrees, and one-third of the secondary winding circuits are delayed in phase by 20 degrees. The remaining third of the secondary winding circuits remain unshifted. The phase-shifted windings use extended-delta-configured windings, and the unshifted windings use delta-configured windings. For other voltages, the respective phase shift required can be obtained by dividing 60 degrees by the number of cells per phase. For example, with five cells per phase, the shifts are +24 degrees, +12 degrees, 0 degrees, −12 degrees, and −24 degrees.

Preferably, multiple power cells connect to each of phase output lines 443, 445, 447, which can represent Phase A, Phase B and Phase C, respectively. Multiple cells can be connected in series on each phase output line, making it possible to produce a medium-voltage input phase line controller with a plurality of low-voltage power cells. Serial connections also make multiple voltage states per phase possible; these multiple voltage states per phase may be used to obtain improved current waveforms. Each power cell may be constructed internally to low-voltage standards, for example, each power cell may have a 600-volts rating, despite its inclusion in a medium-voltage apparatus. In such an embodiment, the individual power cells may be isolated from ground, and other power cells, using insulation suitable for the medium-voltage level being used.

In FIG. 4, for example, phase output line 443 may be serially connected with power cells 423, 429, 435. Likewise, phase output line 445 may be serially connected with power cells 425, 431, 437. Similarly, phase output line 447 may be serially connected with power cells 427, 433, 439. In the present embodiment, preferably the cells feeding phase output lines 443, 445, 447 are joined by a WYE connection with a floating neutral. Thus configured, power cells 423 through 439 can impress a sufficient medium-voltage line-to-line voltage on motor 441, even though power cells 423 through 439 themselves are constructed internally of components rated to low-voltage standards.

In the prior art embodiment in FIG. 4, each of secondary winding circuits 405 through 421 provide isolated three-phase power to power cells 423 through 439, respectively, and the smoothing filter inside each cell will be charged. Depending on which transistors are on, the output voltage may be of either polarity or zero.

In the prior art embodiment in FIG. 4, preferably three power cells are provided per phase output line. Due to the serial connection between the three power cells in each phase output line, such as, for example, power cells 423, 429, and 435 in phase output line 443, it is possible to produce a maximum output voltage magnitude of about 1800 volts DC above neutral. Each power cell may be operated independently of another. Therefore, it is possible to provide at least seven voltage levels per phase to AC motor 441.

In other embodiments, circuits using greater or fewer than three power cells per phase may be used to satisfy the voltage requirements of the inductive motor load.

Figure 5:
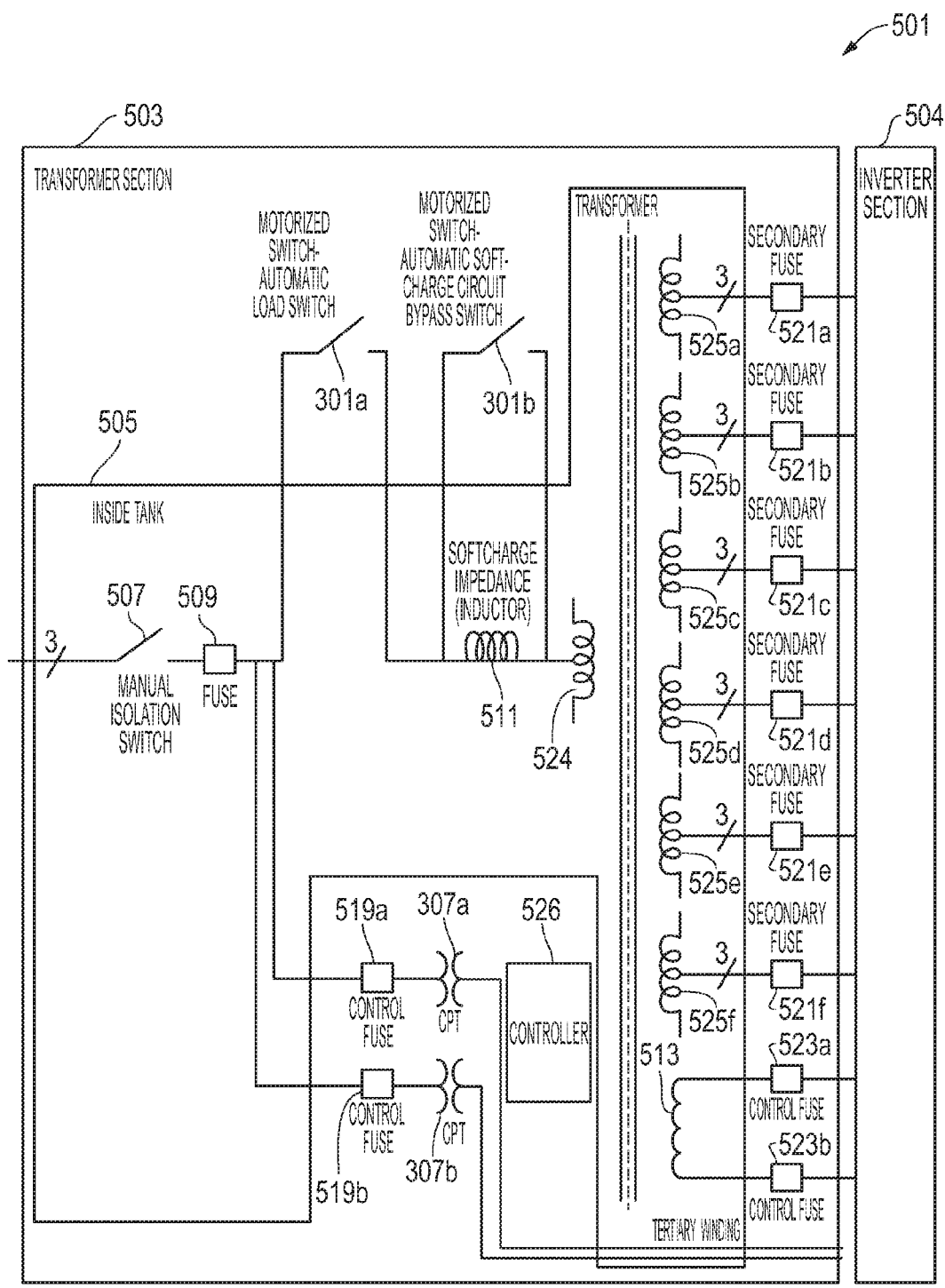
FIG. 5 is a schematic diagram of an illustrative embodiment of a variable frequency drive of the present invention.

Referring now to FIG. 5, a variable frequency drive system 501 of the present invention includes a transformer section 503 and an inverter section 504 that houses the power cells. The transformer section 503 is designed to be liquid-immersed to offer superior environmental protection compared to a dry-type transformer, and uses components that can be used at high supply voltage levels.

The transformer section 503 includes: a transformer tank 505, which houses a manual isolation switch 507 to connect or disconnect main power to the transformer section 503; a power fuse 509 to protect the transformer section; a soft-charge impedance 511 (i.e., an inductor) that together with the fail-open motorized loadbreak switch 301b allow soft-charging of the electronics in the inverter section 504 and soft-starting of the variable frequency drive system 501; tertiary winding 513 to supply power to auxiliary equipment such as fans; a 3-phase primary transformer winding 524; and 3-phase phase-shifted secondary windings 525a, 525b, 525c, 525d, 525e, 525f, that provide the required voltage level for the inverter section 504 and cancel out harmonics. The transformer section 503 also includes: fail-open motorized loadbreak switches 301a, which allows automation of supplying or removing power to the transformer windings, and 301b, which is used in the softcharge circuit; controller 526 that interfaces with motorized loadbreak switches 301a and 301b and the control circuit in the inverter section 504; control power transformers 307a and 307b to provide control power to the control components in the transformer section 503 and the inverter section 504; control fuses 519a and 519b that protect the control power transformers 307a and 307b; and secondary fuses 521a, 521b, 521c, 521d, 521e, and 521f; and control fuses 523a and 523b that protect the conductors exiting the transformer section and the components in the inverter section 504.

Because the fail-open motorized load break switches 301a and 301b, control power transformers 307a and 307b, control fuses 519a and 519b, and controller 526 are not immersed in the dielectric fluid inside the tank 505, they can be installed in the transformer section 503 using a skid base.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below. Although the present invention is shown in a limited number of forms, it is not limited to just these forms, but is amenable to various changes and modifications.

What is claimed is:

1. A motorized switch system connected to a variable frequency drive system for controlling the frequency of a high-voltage power source supplied to a first electric motor, the motorized switch system comprising:
   a transformer section comprising a motorized loadbreak switch system, a control power transformer, a control system programmed with control logic to ensure that the motorized loadbreak switch system opens a motorized loadbreak switch between the high-voltage power source and the variable frequency drive system once the power source is removed, and a tank containing a dielectric fluid, wherein the tank also contains, within the dielectric fluid:
   a manual isolation switch to supply or remove power to the transformer section;
   an impedance for use in soft-starting the variable frequency drive system;
   a primary winding; and
   a plurality of phase-shifted secondary windings.

2. The system of claim 1, wherein the control system comprises at least one input selector and at least one indicator, the control system being configured to accept, via the at least one input selector, operator input for controlling the motorized loadbreak switch, and display information regarding the motorized loadbreak switch via the at least one indicator.

3. The system of claim 2, wherein the motorized loadbreak switch further comprises a motorized switch, the motorized switch comprising:
   a plurality of rotating switches on a longitudinally extending shaft;
   a handle extending axially from the shaft;
   the second electric motor coupled to the shaft, and
   a stored energy mechanism coupled to the shaft.

4. The system of claim 3, wherein the handle is adapted to be manually rotated to operate the motorized switch and to reset the stored energy mechanism.

5. A method for controlling the frequency of a high-voltage power source using a variable frequency drive system supplying power to a first electric motor, the method comprising:
   providing a transformer section comprising a motorized loadbreak switch system, a control power transformer, a control system programmed with control logic to ensure that the motorized loadbreak switch system opens a motorized loadbreak switch between the high-voltage power source and the variable frequency drive system once the power source is removed, and a tank containing a dielectric fluid, wherein the tank also contains, within the dielectric fluid:
   a manual isolation switch to supply or remove power to the transformer section;
   an impedance for use in soft-starting the variable frequency drive system;
   a primary winding; and
   a plurality of phase-shifted secondary windings;
   connecting an energy storage device to the motorized loadbreak switch system; and connecting the control system to the energy storage device.

6. The method of claim 5, wherein the control system comprises at least one input selector and at least one indicator, the control being configured to accept, via the at least one input selector, operating input for controlling the motorized loadbreak switch, and display information regarding the motorized loadbreak switch via the at least one indicator.

7. The method of claim 6, wherein the motorized loadbreak switch further comprises a motorized switch, the motorized switch comprising:
   a plurality of rotating switches on a longitudinally extending shaft;
   a handle extending axially from the shaft;
   the second electric motor coupled to the shaft, and
   a stored energy mechanism coupled to the shaft.

8. The method of claim 7, wherein the handle is adapted to be manually rotated to operate the motorized switch and to reset the stored energy mechanism.

* * * * *